Feb. 4, 1941.        L. F. SOMMERFELD        2,230,850
BINDWEED EXTERMINATOR
Filed Sept. 8, 1939        2 Sheets-Sheet 1

INVENTOR.
LEONHART F. SOMMERFELD
BY
ATTORNEY.

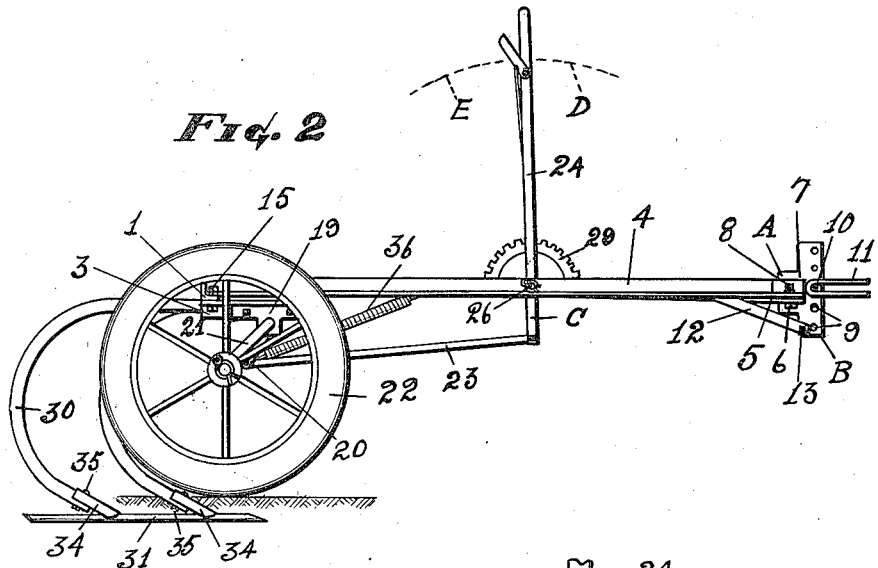
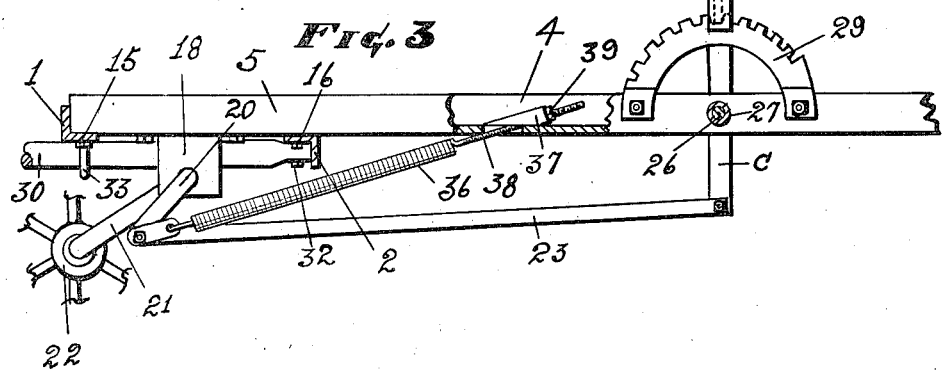
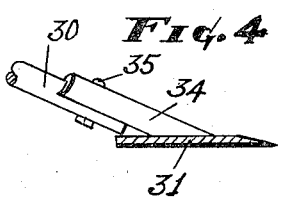

Patented Feb. 4, 1941

2,230,850

UNITED STATES PATENT OFFICE 2,230,850

BINDWEED EXTERMINATOR

Leonhart F. Sommerfeld, Canton, Kans., assignor of one-third to Otto Buller, Bartlesville, Okla.

Application September 8, 1939, Serial No. 293,967

1 Claim. (Cl. 97—144.1)

My invention relates to improvements in a bindweed exterminator and has for its principal object to sever the ground, the blades so positioned as to avoid pulverizing the ground as it passes from the blades whereby moisture in the ground is preserved against excess evaporation.

A further object of my invention is to provide an implement as a bindweed exterminator having blades obliquely crossing its line of travel as the implement is conveyed, whereby the cutting edge of each blade is longitudinally inclined in its contact with the plant, and furthermore, the rearward convergence of the blades will discharge fibrous accumulation freely, and more particular at the rear ends thereof, at which point, said blades interlap but spaced apart to avoid accumulation of the substance being severed as the implement moves forward.

A still further object of my invention is to provide a shaft medially separated, and means to turn each portion independent of the other whereby the carrying frame for the blades may be rocked transverse to its line of travel, as the outer ends of each shaft has a crank upon which a carrying wheel is trunnioned.

A still further object of my invention is to provide an implement inexpensive to construct, simple to operate and adapted to exterminate obnoxious plants, and furthermore to loosen the surface of the ground at a desired depth for cultivation or preparation for seeding.

These and other objects will hereinafter be more fully explained, reference being had to the accompanying drawings forming a part of this specification, in which like characters will apply to like parts in the different views.

Referring to the drawings:

Fig. 2 is a side view of Fig. 1.

Fig. 3 is an enlarged sectional view taken on line 3—3 in Fig. 1, looking in the direction of the arrows.

Fig. 4 is an enlarged sectional view of the blade taken on line 4—4 in Fig. 1.

Figure 1:
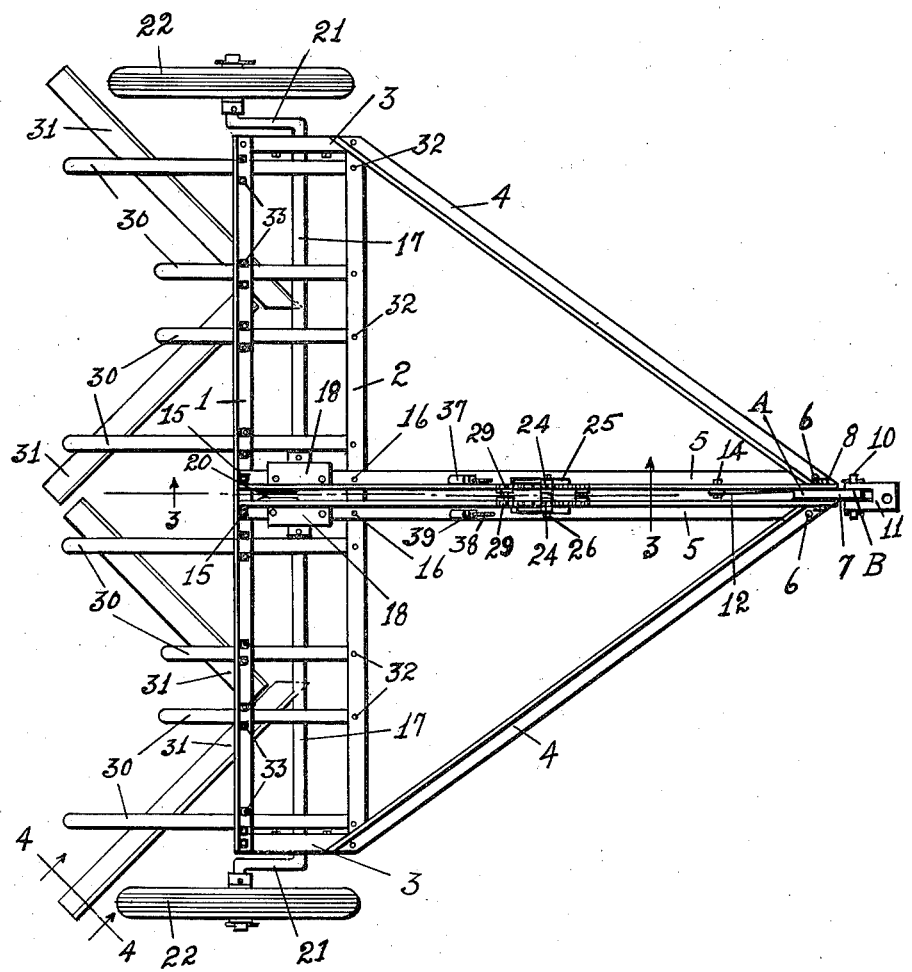
Fig. 1 is a plan view of the implement.

My invention herein disclosed relates broadly to an agricultural implement as an exterminator for obnoxious plants, and more particularly the bindweed, said implement comprising a frame consisting of a pair of bars 1 and 2, said bars being spaced apart and in parallelism, each end of which is connected by bars 3 whereby a rectangular portion of the frame is formed, and a triangular portion is formed by bars 4 connecting to and extending from each end of the rectangular frame, said bars converging to where they seat on their respective bars 5 and being secured thereto by bolts 6, and the said bars being spaced apart to receive a gauge plate 7 secured therebetween by a bolt 8 extending through a rearward extension A integrally and centrally joined to a portion B of said plate, last said portion having a plurality of apertures 9 spaced along said portion and in which a pin 10 of a clevis 11 will engage, by which means the frame may be rocked from a vertical plane, the said clevis being a hitch for a power conveying means, the power means not shown in the drawings. The said plate is secured against rocking movement on its bolt 8 by a brace 12 having one end secured to the lower extremity of the plate by a bolt 13, while the other end angles upward and rearward and being secured to one of the said bars 5 through the medium of a bolt 14.

It will be seen that the said bars 5 are spaced a short distance apart and in parallelism, lying on each side of the center axis of the implement with respect to its line of travel, each thereof being connected to the said bars 1 and 2 by bolts 15 and 16 respectively.

Rockably carried beneath said bars 1 and 2 is a shaft 17 axially alined and being divided centrally to rock independent of each other, said shaft each being trunnioned in their respective bearings 18 and 19, each of which are secured to their respective bars 5 and 3 substantially as shown in Figs. 1, 2 and 3. The said shafts each have a crank 20 on their confronting ends, and a crank 21 on the outer end of each, on which wheels 22 are trunnioned as carrying means for the frame. The inner adjacent cranks each have a rod 23 pivotally connected, the other ends each being connected to their respective lower ends C of levers 24, said levers extending through an opening 25 in the horizontally disposed legs of their respective bars 5 and being pivotally mounted on a bolt 26 extending through the vertically disposed legs of bars 5, there being a sleeve 27 between said bars through which said bolt extends and the said levers, each having a pawl 28 slidably secured in working relation to their respective notched sectors 29, and means on each lever to operate its pawls, being so arranged is means to rock each shaft to raise and lower each side of the frame simultaneously or independently of each other, and the said frame has a plurality of beams 30 secured thereto, said beams varying in length with respect to pairs whereby a blade 31 being carried at the lower extremity of each pair will slantingly position the said blade with respect to the implement's line of travel, and the adjacent pair of beams are oppositely disposed whereby the blades are likewise oppositely positioned with respect to the angle and the said blades being flat and narrow with respect to their length is means to avoid upheaval of the earth thereabove to a great extent as the implement is moved forward, furthermore it will be understood that the cutting capacity of the blades is on the advancing edges thereof as the implement moves forward, whereby the ground above the blades will not be displaced to a great extent but incline to conceal against moisture evaporation as it settles practically on its original bed. The bindweed or other obnoxious plant however will be severed, and by repeated action of the implement extermination of such plants will occur.

It will be seen that the adjacent ends of the blades are separated by interlapping sufficient for continuous cutting the entire length that said blades as a unit expand; being so separated is means to avoid accumulation of sediment at the apex of the blade assembly. It will be understood that the blades and their respective beams are rigidly carried by the frame in such a way as to position one of each pair rearward of the other with respect to their lower extremity, the beams being so secured by their respective straight bolts 32 and U-bolts 33, and the said blades are secured to their respective pair of beams by shanks 34, each shank being integrally joined a spaced distance from its respective end of the blade, the shanks, each with respect to cross section will conform to the beam on which it rests and being removably secured thereto by a bolt 35.

To engage the blades at a desired depth below the surface of the ground the same is accomplished by rocking movement of each wheel crank through the medium of their respective lever arrangements, heretofore described, and to tilt the frame the same is accomplished by moving the clevis to engage with a predetermined aperture through the gauge plate, in other words, the cutting depth may be determined by the said clevis position raising the same upward, then by lowering the frame adjacent the wheels a certain depth is maintained by the lever and notched sector engagement by rocking the upper end of the lever forward as indicated by dotted lines D, and to disengage the blades to clear the surface of the ground said lever is rocked rearward as indicated by dotted lines E, raising the blades.

In Figs. 2 and 3 is shown one of a pair of springs 36 centrally disposed on each side of the implement axis line of travel to counterbalance the weight of the frame rearwardly, said spring having one end secured to the connecting rod adjacent the crank while the other end is secured to bars 5, respectively, through the medium of a sleeve 37 through which a threaded stem 38 will slidably engage, and being moved by a nut 39 threadedly engaging on the stem at its forward end, the other end being secured to the end of the spring. It will now be seen that each wheel may be rocked independently of each other as the case may require with respect to the surface on which they roll, by which arrangement, equal depth of the cutting blades from one side of the implement to the other is maintained, and such modifications may be made as lie within the scope of the appended claim.

Having fully described my invention what I claim as new and desire to secure by Letters Patent is:

In a bindweed exterminator, a frame and a crank shaft rockably secured oppositely at the rear of the frame, a wheel trunnioned on the crank of each shaft and means to rock each crank independent of the other, whereby one side of the frame adjacent the wheels is vertically rocked independent of the other, a plurality of blades and a pair of beams rigidly secured to each blade and to the frame, the beams of each pair varying in length in their rearward extension from the frame, whereby the blade is slantingly positioned from the implement's axis line of travel, and the beams of adjacent pairs of the series are reversed with respect to their extension whereby their respective blades are oppositely disposed with respect to their direction of angle, a gauge plate secured to the front end of the frame, said plate having a plurality of apertures vertically spaced along the forward end thereof, whereby a hitch of a tractor or the like may be selectively attached to raise or lower said front portion of the frame.

LEONHART F. SOMMERFELD.